US012329604B2

(12) United States Patent
Ruiz-Vela et al.

(10) Patent No.: US 12,329,604 B2
(45) Date of Patent: *Jun. 17, 2025

(54) ORTHODONTIC BRACKET WITH A BIASED LIGATING MEMBER

(71) Applicant: World Class Technology Corporation, McMinnville, OR (US)

(72) Inventors: Alberto Ruiz-Vela, Rancho Cucamonga, CA (US); Juergen Bathen, McMinnville, OR (US)

(73) Assignee: World Class Technology Corporation, McMinnville, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,104

(22) Filed: Apr. 24, 2023

(65) Prior Publication Data

US 2023/0255730 A1  Aug. 17, 2023

Related U.S. Application Data

(63) Continuation of application No. 16/863,726, filed on Apr. 30, 2020, now Pat. No. 11,633,263.

(60) Provisional application No. 62/842,461, filed on May 2, 2019.

(51) Int. Cl.
*A61C 7/30* (2006.01)
*A61C 7/28* (2006.01)

(52) U.S. Cl.
CPC ............... *A61C 7/30* (2013.01); *A61C 7/287* (2013.01)

(58) Field of Classification Search
CPC ............. A61C 7/14; A61C 7/287; A61C 7/30
See application file for complete search history.

(56) References Cited

U.S. PATENT DOCUMENTS

| 3,549,528 | A |   | 12/1970 | Armstrong |
|-----------|---|---|---------|-----------|
| 4,978,007 | A |   | 12/1990 | Jacobs et al. |
| 5,015,180 | A |   | 5/1991  | Randklev |
| 5,044,945 | A | * | 9/1991  | Peterson ............. A61C 7/12 433/8 |
| 5,322,435 | A |   | 6/1994  | Pletcher |
| 5,366,372 | A |   | 11/1994 | Hansen et al. |

(Continued)

FOREIGN PATENT DOCUMENTS

EP  3170472 A2  5/2017
JP  2005058742 A  3/2005

(Continued)

OTHER PUBLICATIONS

International Search Report and Written Opinion for International Application No. PCT/US2020/030864, mailed Jul. 15, 2020, 10 pages.

(Continued)

*Primary Examiner* — Ralph A Lewis
(74) *Attorney, Agent, or Firm* — Stoel Rives LLP

(57) ABSTRACT

The disclosure relates to an orthodontic bracket including a ligating member mountable to a bracket body, the ligating member moveable between an open and closed position over an archwire slot. The orthodontic bracket includes a channel formed between the bracket body and the ligating member, and a resilient biasing member extending into the channel, the biasing member interacting with the ligating member to retain the ligating member in either the open or closed position.

20 Claims, 8 Drawing Sheets

(56) References Cited

U.S. PATENT DOCUMENTS

| | | |
|---|---|---|
| 5,429,229 A | 7/1995 | Chester et al. |
| 5,466,151 A | 11/1995 | Damon |
| 6,071,118 A | 6/2000 | Damon |
| 6,183,249 B1 | 2/2001 | Brennan et al. |
| 6,302,688 B1 | 10/2001 | Jordan et al. |
| 6,506,049 B2 | 1/2003 | Hanson |
| 6,582,226 B2 | 6/2003 | Jordan et al. |
| 6,648,638 B2 | 11/2003 | Castro et al. |
| 7,137,812 B2 | 11/2006 | Cleary et al. |
| 7,416,408 B2 | 8/2008 | Farzin-Nia et al. |
| 7,704,072 B2 | 4/2010 | Damon |
| 7,785,101 B2 | 8/2010 | Forster |
| 7,909,603 B2 | 3/2011 | Oda |
| 8,029,276 B1 | 10/2011 | Lokar |
| 8,033,824 B2 | 10/2011 | Oda et al. |
| 8,636,508 B2 | 1/2014 | Forster |
| 8,998,607 B2 | 4/2015 | Oda |
| 9,277,973 B2 | 3/2016 | Damon |
| 9,364,298 B2 | 6/2016 | Huang |
| 9,532,853 B2 | 1/2017 | Huang |
| 9,730,770 B2 | 8/2017 | Yick et al. |
| 9,744,004 B2 | 8/2017 | Damon |
| 9,744,044 B2 | 8/2017 | Cohen et al. |
| 9,827,073 B2 | 11/2017 | Farzin-Nia et al. |
| 9,867,680 B2 | 1/2018 | Damon |
| 9,895,207 B2 | 2/2018 | Damon |
| 9,943,384 B2 | 4/2018 | Huang |
| 9,956,059 B2 | 5/2018 | Huang |
| 10,159,544 B2 | 12/2018 | Damon |
| 11,633,263 B2 * | 4/2023 | Ruiz-Vela ............ A61C 7/287 433/11 |
| 2005/0239012 A1 | 10/2005 | Bathen et al. |
| 2008/0286710 A1 | 11/2008 | Cinader, Jr. et al. |
| 2009/0004618 A1 | 1/2009 | Oda et al. |
| 2009/0155734 A1 | 6/2009 | Damon |
| 2009/0298003 A1 | 12/2009 | Wei et al. |
| 2010/0055626 A1 | 3/2010 | Endou et al. |
| 2010/0055636 A1 | 3/2010 | Yeh et al. |
| 2010/0178629 A1 | 7/2010 | Oda et al. |
| 2010/0285420 A1 | 11/2010 | Oda |
| 2011/0086323 A1 | 4/2011 | Wessinger |
| 2012/0141948 A1 | 6/2012 | Farzin-Nia et al. |
| 2013/0130189 A1 | 5/2013 | Roncone |
| 2013/0189638 A1 | 7/2013 | Oda |
| 2013/0330683 A1 | 12/2013 | Wang et al. |
| 2014/0205960 A1 | 7/2014 | Farzin-Nia et al. |
| 2014/0242533 A1 | 8/2014 | Yeh et al. |
| 2014/0272753 A1 | 9/2014 | Sommer et al. |
| 2015/0017597 A1 | 1/2015 | Solano Reina et al. |
| 2015/0223913 A1 | 8/2015 | Yick et al. |
| 2016/0015482 A1 | 1/2016 | Hagelganz et al. |
| 2016/0128807 A1 | 5/2016 | Oda |
| 2017/0119501 A1 | 5/2017 | Payne et al. |

FOREIGN PATENT DOCUMENTS

| | | |
|---|---|---|
| JP | 2011529727 A | 12/2011 |
| JP | 2015522394 A | 8/2015 |
| KR | 101693239 B1 | 1/2017 |
| WO | 2009006286 A2 | 1/2009 |
| WO | 2010014518 A2 | 2/2010 |
| WO | 2014018095 A1 | 1/2014 |

OTHER PUBLICATIONS

European Patent Office, Extended European Search Report for European Patent Application No. 20799549.9, mailed Apr. 18, 2023, 9 pages.

* cited by examiner

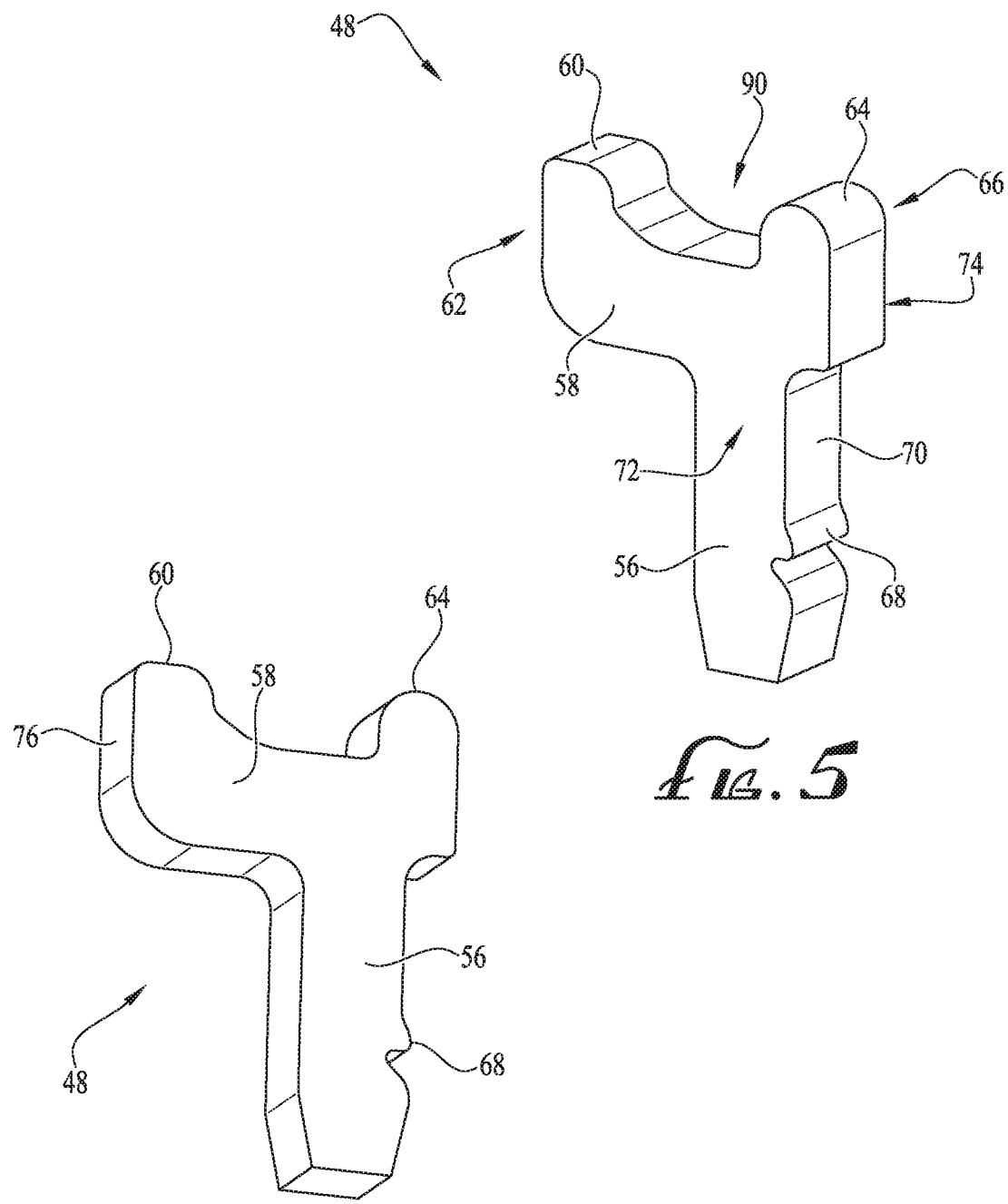

ORTHODONTIC BRACKET WITH A BIASED LIGATING MEMBER

RELATED APPLICATION DATA

This application is a continuation of and claims the benefit under 35 U.S.C. § 120 of U.S. patent application Ser. No. 16/863,726, filed Apr. 30, 2020 and entitled "ORTHODONTIC BRACKET WITH A BIASED LIGATING MEMBER," which is a nonprovisional of and claims the benefit under 35 U.S.C. § 119 (e) of U.S. Provisional Patent Application No. 62/842,461, filed May 2, 2019 and entitled "ORTHODONTIC BRACKET WITH A BIASED LIGATING MEMBER," the disclosures of which are incorporated by reference herein in their entireties.

BACKGROUND

This application generally relates to self-ligating orthodontic brackets, and more specifically, to such brackets having a biased ligating member designed for improved overall performance.

Orthodontic treatment typically involves orthodontic devices designed to apply mechanical forces to a patient's teeth to urge improperly positioned teeth into a correct alignment. One form of orthodontic treatment includes the use of self-ligating orthodontic brackets, where a single bracket is adhered to each individual tooth in a subset of teeth with a bonding material or other adhesive. Once the brackets are in position on the teeth, an archwire is inserted through a slot formed on each of the brackets. In this configuration, tightening of the archwire applies pressure on the brackets, which in turn, urge movement of the teeth into a desired position and orientation.

In some designs, self-ligating brackets may include a ligating door or slide with a spring or other biasing element to help retain the archwire in position within the slot. The ligating slide is movable between closed and open positions to allow insertion and retention of the archwire within an archwire slot of the bracket. In such designs, the biasing element provides a retention force that holds the ligating slide in either the open or closed position for improved use. In many instances, the ligating slide is typically cycled (e.g., opened and closed) approximately 6 to 10 times during the course of orthodontic treatment. Accordingly, conventional self-ligating brackets are designed to optimize the retention force of the spring for short life-cycles. On occasion, however, the number of cycles for specific treatments may increase due to additional archwire adjustments, additional archwire changes, or auxiliary treatment mechanics. Further, some patients learn how to operate the ligating slide and may "play" with their brackets by opening and closing the ligating slide, which results in additional open and close cycles, thereby degrading the spring retention force over time. Excessive reduction of the spring retention force may result in inadvertent opening of the ligating slide during the treatment phase, which may increase the likelihood of disengagement of the archwire from the bracket and result in treatment inefficiency due to a lack of proper mechanical force being applied to the tooth. Moreover, when the archwire disengages from the slot, a practitioner may need to address any issues and/or replace the bracket/archwire as needed, which may extend overall treatment time for the patient. In other instances, reduction of the spring retention force may result in a complete disengagement of the ligating slide from the bracket.

Accordingly, the present inventors have identified a need for an improved design of an orthodontic bracket for providing an effective and consistent retention force for a significant number of opening/closing cycles to ensure optimum performance for a variety of uses and circumstances. Such a design maximizes the number of open and close cycles the ligating slide and biasing element can tolerate without experiencing a dramatic reduction in the retention force that holds the ligating slide in either the open or closed position, thereby minimizing long-term performance issues of the orthodontic bracket. In addition, the improved design secures the ligating slide against the orthodontic bracket to prevent complete disengagement from the bracket. Additional aspects and advantages will be apparent from the following detailed description of example embodiments, which proceeds with reference to the accompanying drawings.

BRIEF DESCRIPTION OF THE DRAWINGS

FIGS. 5-6 illustrate a resilient biasing element of the orthodontic bracket of FIG. 1 in accordance with one embodiment.

DETAILED DESCRIPTION OF EXAMPLE EMBODIMENTS

With reference to the drawings, this section describes various embodiments of an orthodontic bracket system and its detailed construction and operation. Throughout the specification, reference to "one embodiment," "an embodiment," or "some embodiments" means that a described feature, structure, or characteristic may be included in at least one embodiment of an orthodontic bracket. Thus, appearances of the phrases "in one embodiment," "in an embodiment," or "in some embodiments" in various places throughout this specification are not necessarily all referring to the same embodiment. Further, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like.

In the following description, certain components of the orthodontic brackets are described in detail. It should be understood that in some instances, well-known structures, materials, or operations are not shown or described in detail to avoid obscuring more pertinent aspects of the embodiments. In addition, although the embodiments may illustrate and reference specific orthodontic bracket designs, other embodiments may include additional or fewer components than the described embodiments.

Figure 1:
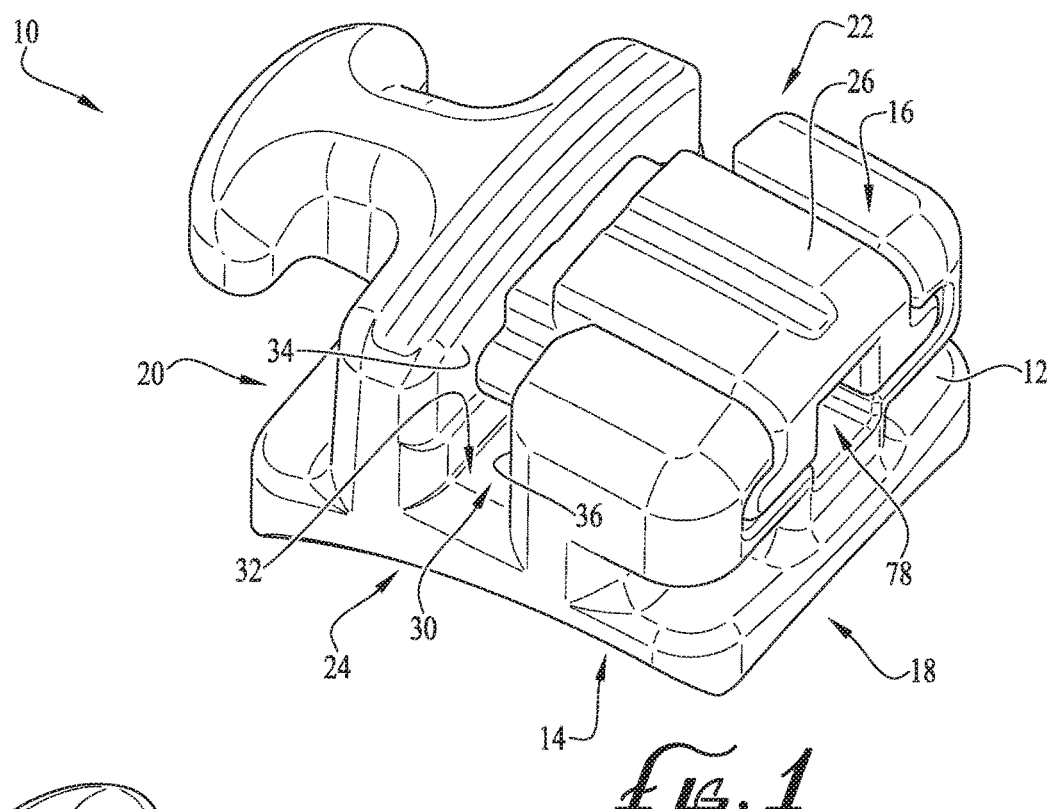
FIG. 1 is a top perspective view of an orthodontic bracket in accordance with one embodiment.

FIG. 1 illustrates an example embodiment of an orthodontic self-ligating bracket 10 including a bracket body 12 with a sliding door 26 designed to move relative to the bracket body 12 between a closed position and an open position. To establish a frame of reference, the following description (unless otherwise indicated) refers to the bracket 10 as being attached to a labial surface of a tooth on an upper jaw of the patient. For example, with reference to the bracket body 12 illustrated in FIG. 1, when the bracket body 12 is mounted to the tooth in the patient's upper jaw, the bracket body 12 has a lingual side 14 (see also FIG. 3), a labial side 16, an occlusal side 18, a gingival side 20, a mesial side 22, and a distal side 24. Terms such as labial, lingual, mesial, distal, occlusal, and gingival used to describe the bracket 10 in this specification are relative to this frame of reference. It should be understood, however, that the embodiments of the disclosed subject matter are not limited to the chosen reference frame and descriptive terms, as the orthodontic bracket 10 may be used on other teeth and in other orientations within the oral cavity. For example, the bracket 10 may also be located on an anterior tooth in the lower jaw or maxilla and be within the scope of the disclosed subject matter. Those having ordinary skill in the art will recognize that the descriptive terms used herein may not directly apply when there is a change in the frame of reference. The disclosed subject matter is intended to be independent of location and orientation within the oral cavity and the relative terms used to describe the illustrated embodiments are to provide a clear description in conjunction with the drawings. As such, the relative terms labial, lingual, mesial, distal, occlusal, and gingival in no way limit the disclosed subject matter to a particular location or orientation but are instead offered to aid in understanding the disclosed subject matter.

With general reference to FIG. 1, the bracket 10 includes a bracket body 12 mountable to a tooth via a base structure 28 (see FIG. 3) on the lingual side 14 of the bracket body 12. The base structure 28 may include a series of grooves or ridges for receiving an adhesive or other bonding material to provide a solid connection with the tooth and prevent dislodging. The bracket body 12 further includes an archwire slot 30 extending across the bracket body 12 from a first side to a second side generally in a mesial-distal direction, such as from the mesial side 22 to the distal side 24. The archwire slot 30 includes a generally planar base surface 32 extending across the length of the slot 30 and opposing side walls 34, 36 extending upwardly from the base surface 32 in the labial direction. In some embodiments, the side walls 34, 36 are perpendicular to the base surface 32 to form a generally rectilinear archwire slot 30 (e.g., a slot having a generally rectangular or square shape), the archwire slot 30 having open ends formed along the labial side 16, and along the mesial and distal sides 22, 24, respectively, of the bracket body 12.

Figure 2:
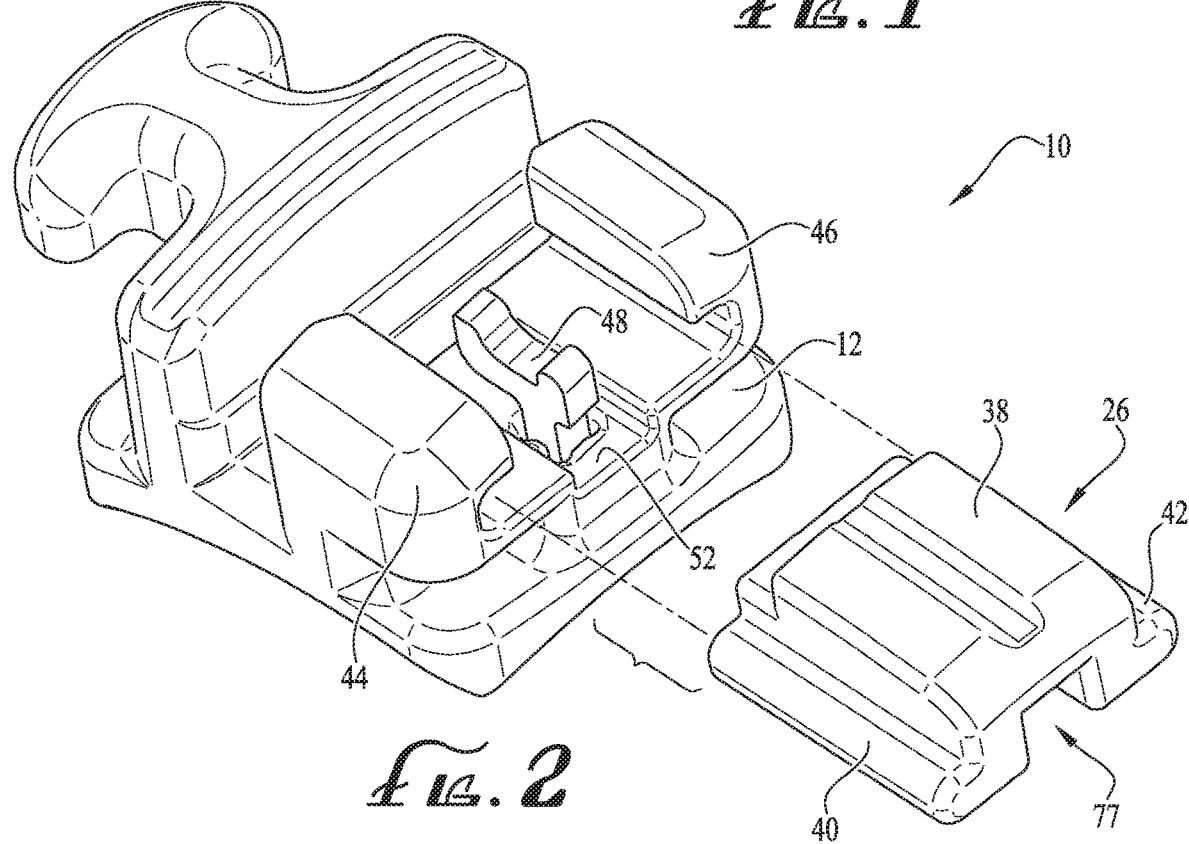
FIGS. 2 and 3 collectively illustrate the orthodontic bracket of FIG. 1 with the sliding door uncoupled from the bracket body to illustrate features of an internal resilient biasing member.

With reference to FIG. 2, the bracket body 12 further includes a sliding ligating member or door 26 arranged on the labial side 16 of the bracket body 12 for retaining an archwire (not shown) within the archwire slot 30. The sliding door 26 includes a base 38 and a pair of side rails 40, 42 designed to be slidably received within a corresponding pair of guides 44, 46 formed on the bracket body 12. Once the sliding door 26 is inserted into position within the bracket body 12, the side rails 40, 42 and guides 44, 46 work together to restrict movement of the sliding door 26 to the gingival-occlusal direction when the sliding door 26 is opened or closed. When the sliding door 26 is in the closed position, the archwire is urged downwardly into the archwire slot 30 to apply pressure to the bracket body 12 and the patient's teeth to produce the desired tooth movement.

Figure 3:
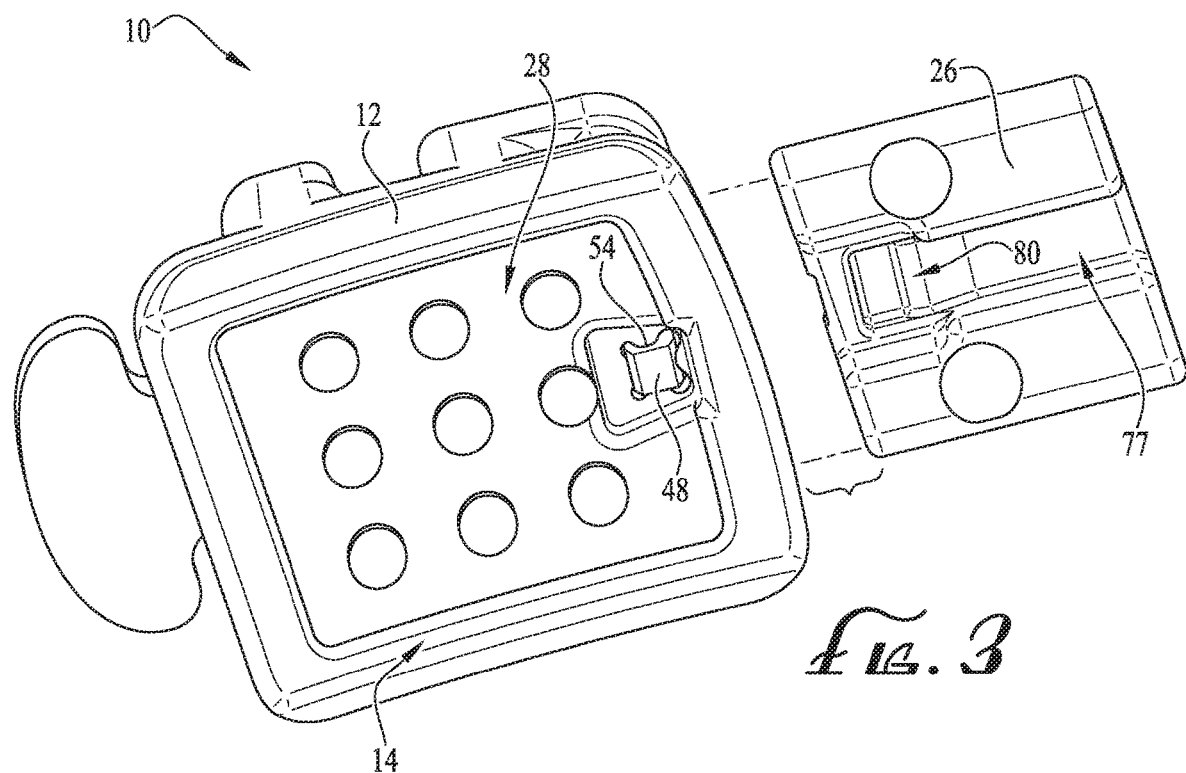
Figure 4:
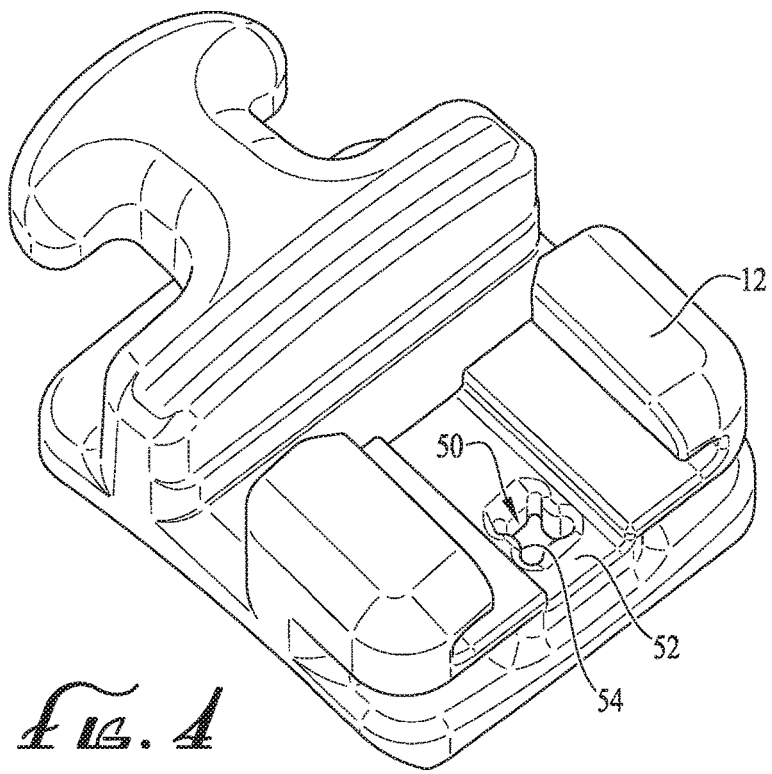
FIG. 4 illustrates the orthodontic bracket of FIG. 1 with the sliding door and biasing element removed to illustrate interior features of the bracket body.

With collective reference to FIGS. 2-4, the bracket body 12 further houses a resilient biasing member 48 designed to impart force upon the sliding door 26 to help maintain the sliding door 26 either in a closed position or an open position as further described below with particular reference to FIGS. 5-8. With particular reference to FIGS. 2-4, the biasing member 48 extends generally upright along the lingual-labial direction, with a lower portion of the biasing member 48 inserted into and retained within a seat 50 formed along a labial surface 52 of the bracket body 12, the seat 50 opening along the labial surface 52 and extending downwardly through the bracket body 12 from the labial surface 52 to the base surface 28 on the lingual side 14 of the bracket body 12 (see FIG. 3). In one preferred configuration, the seat 50 opens onto the base surface 28 as illustrated in FIG. 3, but in other embodiments, the seat 50 may be closed off along the base surface 28. In configuration where the seat 50 opens onto the base surface 28, an adhesive may be applied from the lingual side 14 or from the labial surface 52 to adhesively attach the lower portion of the biasing member 48 to the bracket body 12. In other embodiments, the seat 50 may include one or more side walls 54 each having a ridged profile that extends toward a central portion of the seat 50, the side walls 54 designed to interfere with and firmly grip the biasing member 48 within the seat 50 to further secure the biasing member 48 in position. Further details of the biasing member 48 are provided below.

FIGS. 5-8 collectively illustrate features of the biasing member 48 and its interaction with the sliding door 26 to retain the sliding door 26 in either the open or closed conditions as desired. FIGS. 5 and 6 illustrate an example embodiment of the biasing member 48 in accordance with one embodiment. With general reference to FIGS. 5 and 6, the biasing member 48 is arranged in a generally T-shaped configuration with a generally upright stem 56 and a cross member 58 supported by and disposed generally orthogonal to the stem 56. In some embodiments, the cross member 58 may instead be skewed or angled relative to the upright stem 56 to vary the retention force as needed. The cross member 58 includes a first projection 60 extending upwardly from the cross member 58 at a first end 62 thereof, and a second projection 64 extending upwardly from the cross member 58 along a second end 66 thereof. The projections 60, 64 are arranged along respective axes that are generally parallel to the axis of the stem 56, and extend along the lingual-labial direction, the projections 60, 64 being offset from one another to define a gap or opening 90 therebetween. In some embodiments, the stem 56 may further include one or more ribs 68 formed along a side surface 70 extending between a first (front) surface 72 and an opposite second (rear) surface 74. As noted previously, the ribs 68 may interact with the one or more side walls 54 to help secure and retain the biasing member 48 in position within the seat 50 on the bracket body 12 (see FIG. 4).

With particular reference to FIG. 6, the cross member 58 further includes a leading edge surface 76 extending between the first and second surfaces 72, 74 of the biasing member 48. As further described below with reference to FIGS. 7-8, the leading edge surface 76 defines the perimeter shape of the biasing member 48, whereby the overall shape of the biasing member 48 is contained within the first and second surfaces 72, 74 as illustrated in FIGS. 5-6.

Preferably, the stem 56, cross member 58, and projections 60, 62 are formed as unitary, integral components of the biasing member 48. In some embodiments, the biasing member 48 may be made of nickel titanium and etched, laser cut, machined (e.g., electrical discharge machining) or otherwise manufactured from a substantially planar stock or sheet to create a biasing member 48 with the first surface 72 and the opposite second surface 74 being substantially planar and the leading edge surface 76 extending therebetween. In other embodiments, the biasing member 48 may be made of any other suitable material.

Figure 7:
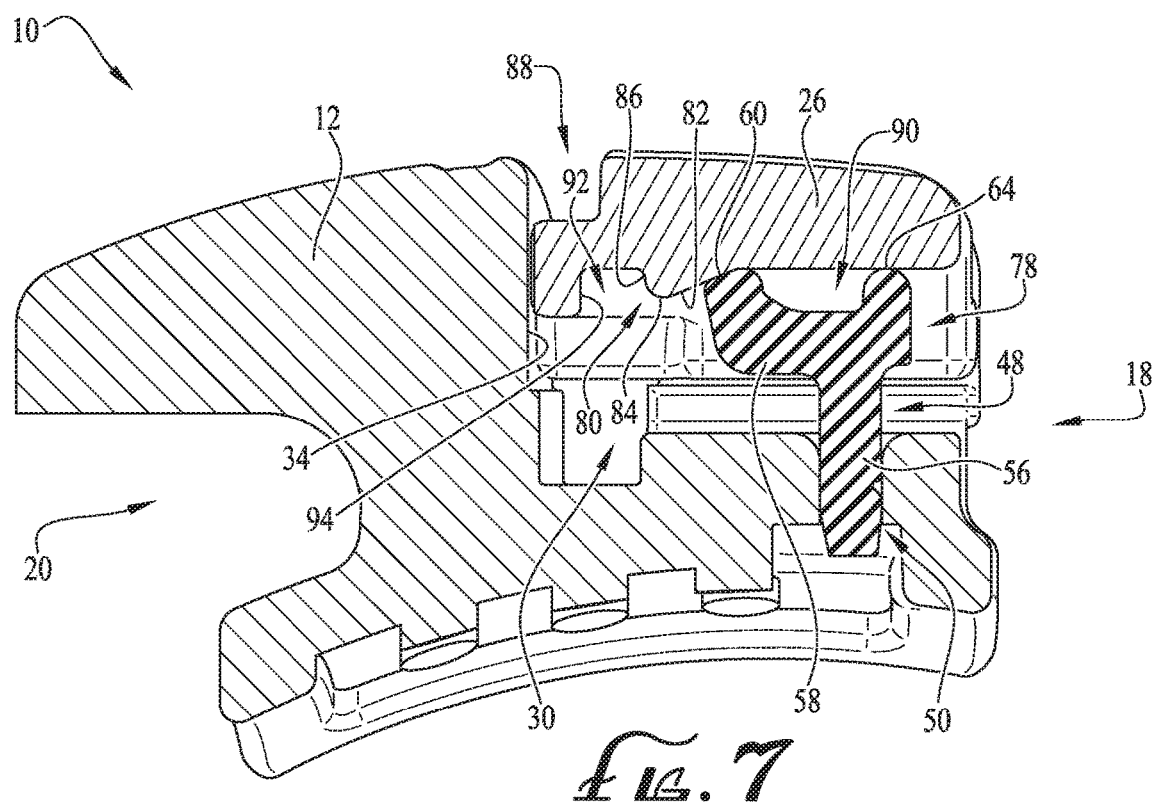
FIG. 7 is a cross-sectional view of the orthodontic bracket of FIG. 1 illustrated in a closed condition in accordance with one embodiment.
Figure 8:
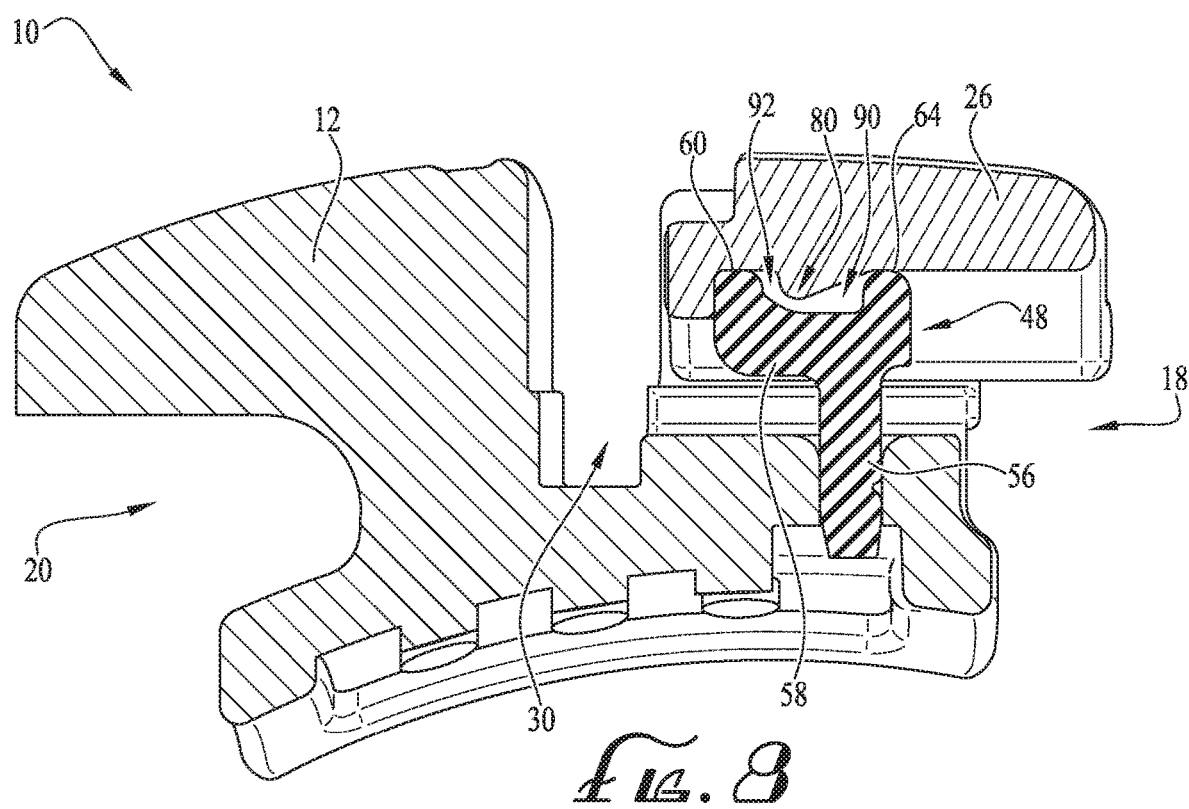
FIG. 8 is a cross-sectional view of the orthodontic bracket of FIG. 1 illustrated in an open condition in accordance with one embodiment.

FIGS. 7-8 are each cross-section views of the assembled bracket 10 illustrated in the closed and open condition, respectively. With reference to FIG. 7 (see also FIGS. 1-3), the sliding door 26 includes a slot 77 formed on an underside thereof, the slot 77 extending from a front end of the sliding door 26 and opening onto a back end thereof. The sliding door 26 further includes a ridge 80 formed within the slot 77 (see FIG. 3), where the ridge 80 interacts with the resilient member 48 as further described in detail below. In some embodiments, the ridge 80 may include a ramped guiding surface 82 formed along one end, the guiding surface 82 leading to a curved tip or end 84 formed at an apex of the ridge 80. A stop surface 86 extends from the curved end 84 toward the underside of the sliding door 26.

With reference to FIG. 7, when the sliding door 26 is coupled to the bracket body 12, a channel 78 is formed therebetween, the channel 78 incorporating the slot 77 of the sliding door 26 and extending from the side wall 34 (which forms one wall of the archwire slot 30) and opening along the occlusal side 18 of the bracket body 12. While the channel 78 and the slot 77 are illustrated as being opened along their respective back ends, in other embodiments, one or both of the slot 77 and channel 78 may instead be closed along the occlusal side 18 of the bracket body 12 if desired.

With reference to FIGS. 7-8, the following discusses positioning of the biasing member 48 within the bracket body 12, followed by a discussion of the interaction of the biasing member 48 and the ridge 80 to facilitate the opening and closing functionality of the sliding door 26. As illustrated in FIG. 7 and discussed previously with reference to FIGS. 1-4, the biasing member 48 is positioned within the seat 50 formed on the bracket body 12. When the biasing member 48 is secured therein, a portion of the stem 56 extends from the seat 50 and into the channel 78, where the stem 56 extends generally upright along the lingual-labial direction. Further, the entirety of the cross member 58 is positioned within the channel 78 and is arranged generally parallel to the gingival-occlusal sliding direction of the sliding door 26, with the leading edge surface 76 (see FIG. 6) positioned within the slot 77 and generally perpendicular to the topographic surface of the sliding door 26.

With collective reference to FIGS. 7-8, when the sliding door 26 is in the closed position, the projection 60 of the resilient biasing member 48 rests against the ridge 80 along a beginning portion of the ramped guiding surface 82. In this position, the resilient biasing member 48, via the cross member 58 and the projection 60, collectively create a biasing force sufficient to resist unwanted movement of the sliding door 26 toward the occlusal side 18 of the bracket body 12 and thereby maintain the sliding door 26 in the closed position.

Figure 10:
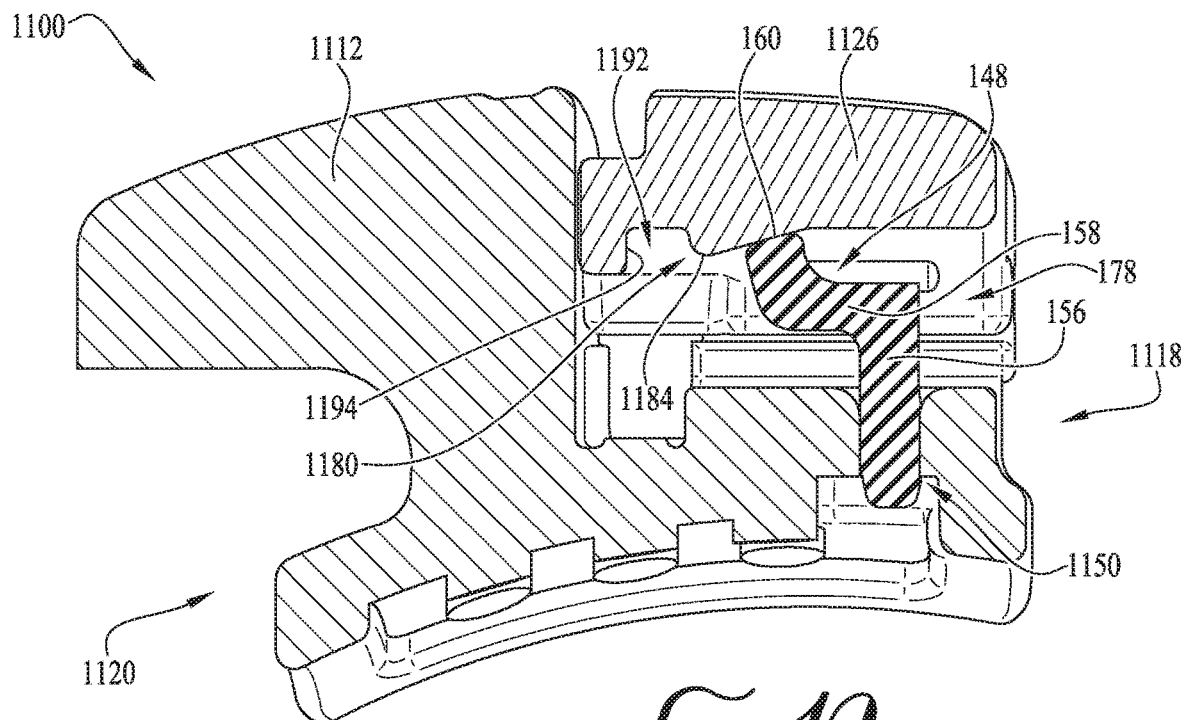
FIG. 10 is a cross-sectional view of the orthodontic bracket of FIG. 1 incorporating the resilient biasing element of FIGS. 9A-9G, the bracket illustrated in a closed condition in accordance with one embodiment.
Figure 11:
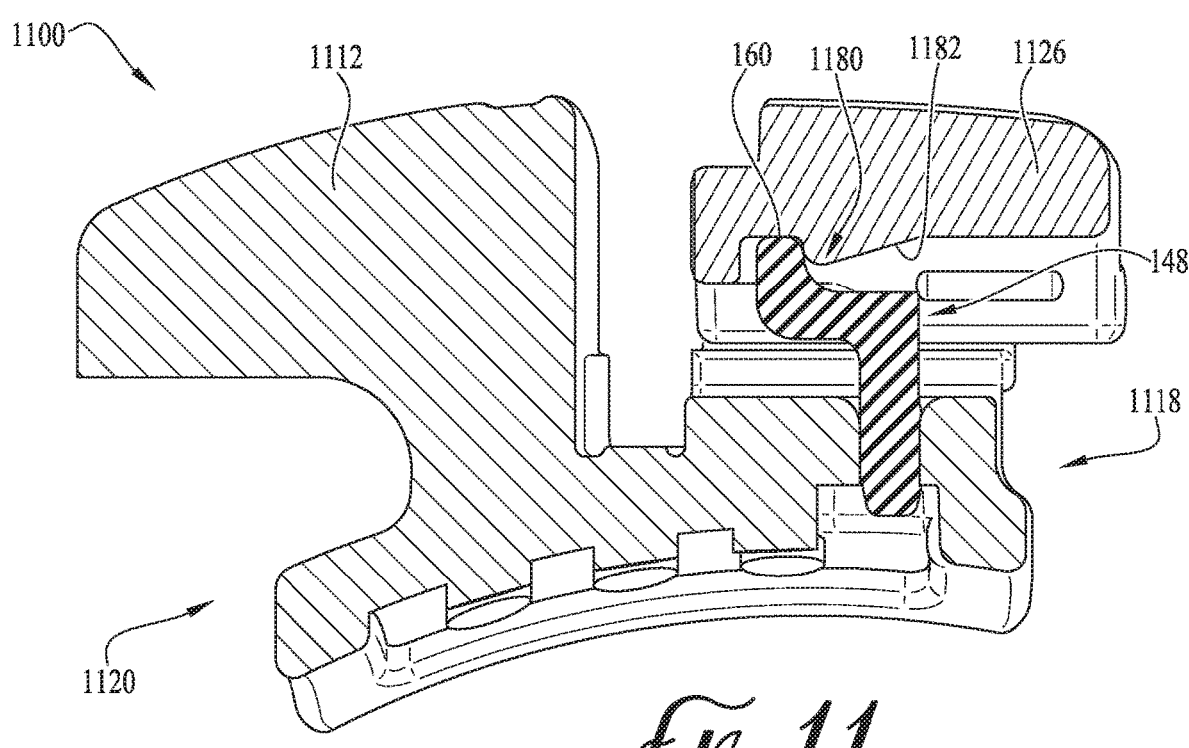
FIG. 11 is a cross-sectional view of the orthodontic bracket of FIG. 1 incorporating the resilient biasing element of FIGS. 9A-9G, the bracket illustrated in an open condition in accordance with one embodiment.

To open the sliding door 26, a tool (not shown) may be inserted into a recessed region 88 formed along the labial surface of the sliding door 26. When the sliding door 26 is pulled rearwardly toward the occlusal side 18 of the bracket body 12, the ramped surface 82 of the ridge 80 slides against the projection 60 of the resilient biasing member 48. As the sliding door 26 continues being pulled rearwardly, the cross member 58 of the resilient biasing member 48 deflects forwardly and downwardly toward the gingival side 20 in an arcuate path about the stem 56. As the resilient biasing member 48 continues its deflection, the curved end 84 of the ridge 80 passes over and beyond the projection 60 of the resilient biasing member 48. Once the ridge 80 moves beyond the projection 60, the ridge 80 is positioned within the gap or opening 90 formed between the first and second projections 60, 64 (see FIG. 8). When the ridge 80 is within the opening 90, the force imparted against resilient biasing member 48 is released, thereby urging the resilient biasing member 48 to return to its upright and unbiased position, with the projection 60 being positioned within a pocket 92 formed adjacent a forward end of the sliding door 26 between a front wall 94 on an underside of the sliding door 26 and the ridge 80. In some embodiments, an upper portion of the projection 60 abuts the front wall 94 and an underside of the sliding door 26 to ensure that the door 26 is securely retained against the bracket body 12 when in the open position. In other embodiments, depending on the width of the pocket 92 and the width of the projection 60, the projection 60 may abut one or both of the front wall 94 and the stop surface 86 of the ridge 80 when the projection 60 is in the pocket 92. In this configuration, the projections 60, 64 of the resilient biasing member 48 help maintain the sliding door 26 in the open position to access the archwire slot 30 (e.g., to position an archwire or to adjust an existing archwire), and also to ensure that the sliding door 26 is not inadvertently opened too far such that it may be decoupled from the bracket body 12. In some embodiments, the second projection 64 of the resilient biasing member 48 may be eliminated since the projection 60 and pocket 92 may cooperate to limit the rearward movement of the sliding door 26 (as illustrated in FIGS. 10-11).

To close the sliding door 26 from the open position, the resistive force created by the projection 60 against the ridge 80 must be overcome. As the sliding door 26 moves from the open position to the closed position, the ridge 80 moves within the opening 90 toward the projection 60. As the ridge 80 rides against the projection 60, the cross member 58 is deflected forwardly and downwardly toward the gingival side 20 in an arcuate path about the stem 56. The cross member 58 continues deflecting until the ridge 80 moves beyond the projection 60, at which point, the cross member 58 deflects along the arcuate path to its original upright and unbiased position (as shown in FIG. 7).

FIGS. 9A-9G illustrate various views of another embodiment for a resilient biasing element 148 that may be incorporated into the orthodontic bracket of FIG. 1 in place of the resilient biasing element 48 of FIGS. 5-6. With reference to FIGS. 9A-9G, the resilient biasing element 148 includes many of the same components as the resilient biasing element 48 of FIGS. 5-6, but notably eliminates the second (rear) projection 64 for a more streamlined design. The following passages provide more information regarding the biasing element 148, but in some instances, may only briefly describe certain features of the resilient biasing element 148 with the understanding that like features of the resilient biasing elements 48, 148 will operate similarly unless noted otherwise. Discussion of such features is omitted to avoid repetition.

With collective reference to FIGS. 9A-9G, the resilient biasing element 148 is arranged in a generally inverted-L shape with a generally upright stem 156 and a cross member 158 supported by and disposed generally orthogonal to the stem 156. In some embodiments, the cross member 158 may instead be skewed or angled relative to the upright stem 156 to vary the retention force as needed. The cross member 158 includes a first projection 160 extending upwardly from the cross member 158 at a first end 162 thereof. The projection 160 is arranged along an axis that is generally parallel to the corresponding axis of the stem 156 and extends along the lingual-labial direction. In some embodiments, the stem 156 may further include one or more ribs 168 for further securing the biasing element 148 in position within the bracket body 1112 (see FIG. 10), the ribs 168 being formed along a ridge surface 170 extending between a first (front) surface 172 and an opposite second (rear) surface 174.

Figure 9A:
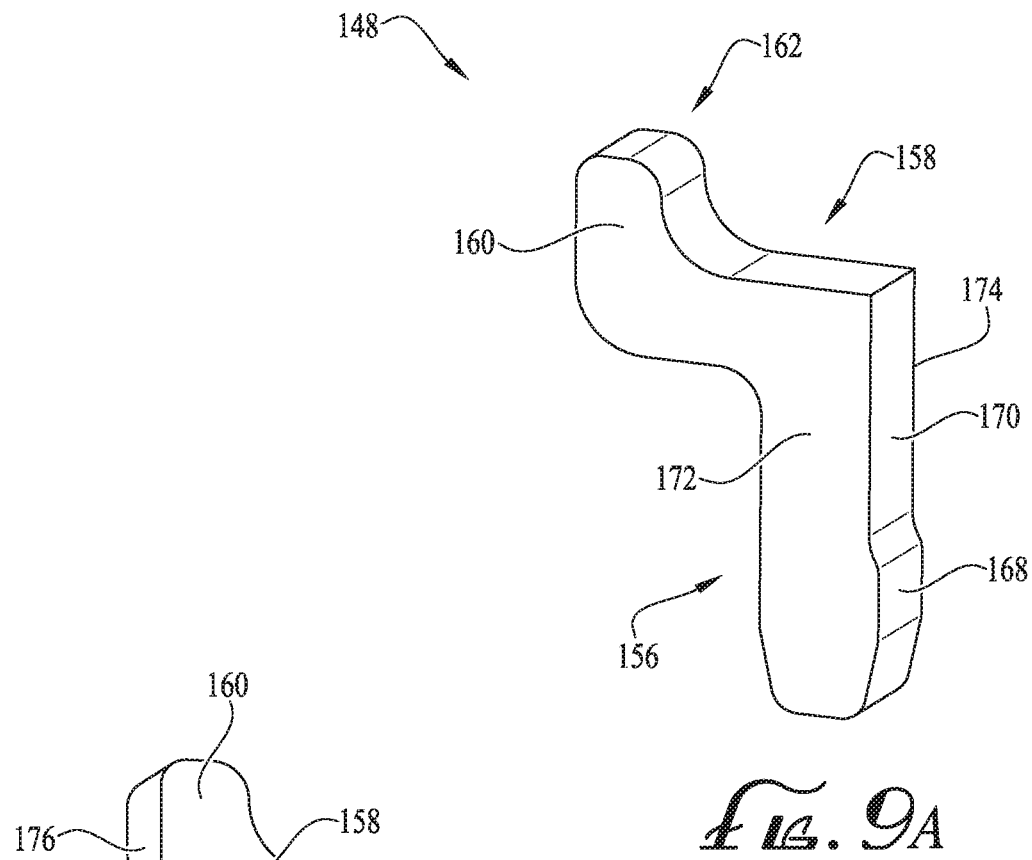
FIGS. 9A-9G are various views of another embodiment for a resilient biasing element that may be incorporated into the orthodontic bracket of FIG. 1.
Figure 9B:
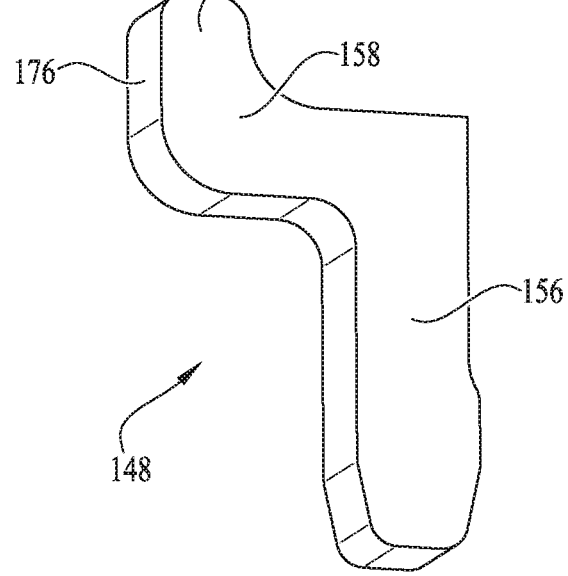
Figure 9C:
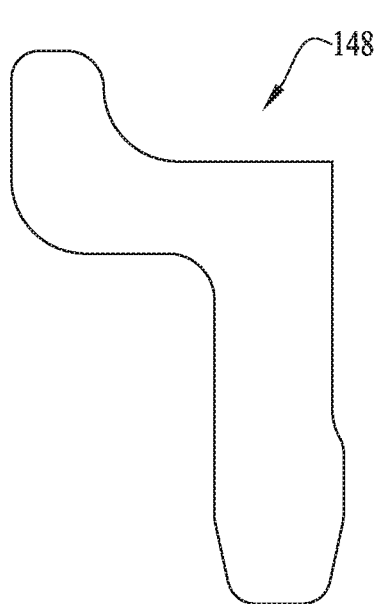
Figure 9D:
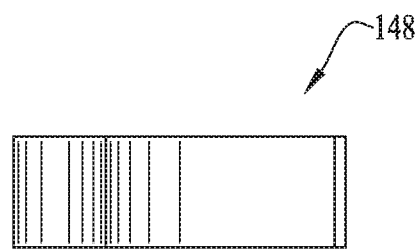
Figure 9E:
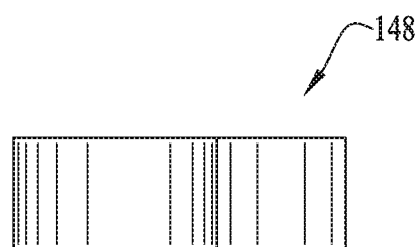
Figure 9F:
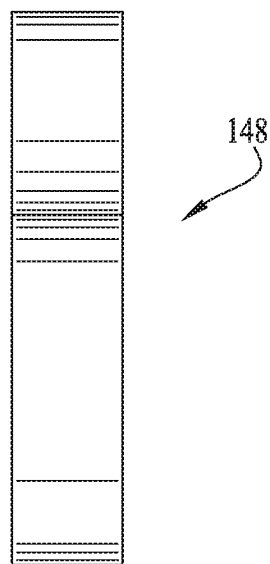
Figure 9G:
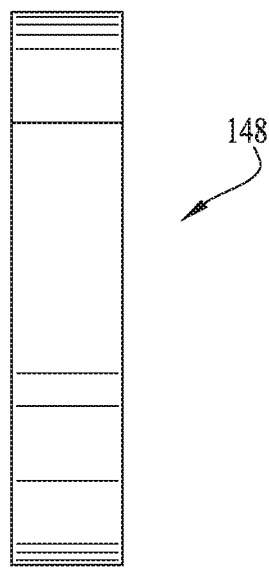

With particular reference to FIG. 9B, the cross member 158 further includes a leading edge surface 176 extending between the first and second surfaces 172, 174 of the biasing member 148. As further described below with reference to FIGS. 10-11, the leading edge surface 176 defines the perimeter shape of the biasing member 148, whereby the overall shape of the biasing member 148 is contained within the first and second surfaces 172, 174 as illustrated in FIGS. 9A-9G. Preferably, the stem 156, cross member 158, and projection 160 are formed as unitary, integral components of the biasing member 148 in a similar fashion as described previously with reference to biasing member 48.

Turning now to FIGS. 10-11, the following section discusses operation of the biasing member 148 in accordance with one example embodiment. FIGS. 10-11 are cross-section views of an assembled bracket 1100 illustrated in the closed and open condition, respectively. The bracket 1100 includes many of the same features and characteristics of the bracket 10 described with reference to FIGS. 7-8. Accordingly, many of the features of the bracket 1100 and the door 1126 are not further described herein to avoid repetition, with the understanding that they share the same features as the bracket 10 and door 26 described previously. Accordingly, the following passages focus primarily on how the resilient biasing member 148 interacts with the bracket 1100 and door 1126.

With reference to FIG. 10, the resilient biasing member 148 is received in a seat 1150 of the bracket 1100, with the ribs 168 (and any adhesives that may be used) securing the biasing member 148 in position. When the biasing member 148 is inserted into the bracket body 1112, the stem 156 extends generally upright along the lingual-labial direction and the cross member 158 is generally parallel to the gingival-occlusal sliding direction of the sliding door 1126. In this configuration, a portion of the stem 156 extends from the seat 1150 into the channel 178, and the entirety of the cross member 158 is positioned within the channel 178. In this arrangement, the leading edge surface 176 (see FIG. 9B) is positioned generally perpendicular to the topographic surface of the sliding door 1126 positioned within the channel 178.

With reference to FIG. 10, when the sliding door 1126 is in the closed position, the projection 160 of the resilient biasing member 148 rests against a portion of the ramped guiding surface 1182 (see FIG. 11) of the ridge 1180 formed underneath the sliding door 1126. In this position, the resilient biasing member 148, via the cross member 158 and the projection 160, collectively create a biasing force sufficient to resist backward movement of the sliding door 1126 toward the occlusal side 1118 of the bracket body 1112 and thereby maintain the sliding door 1126 in the closed position.

Turning now to FIG. 11, when the sliding door 1126 is pulled rearwardly toward the occlusal side 1118 of the bracket body 1112, the ramped surface 1182 of the ridge 1180 slides against the projection 160 of the resilient biasing member 148. As the sliding door 1126 continues being pulled rearwardly, the cross member 158 of the resilient biasing member 148 deflects forwardly and downwardly toward the gingival side 1120 of the bracket 1100 in an arcuate path about the stem 156. As the resilient biasing member 148 continues its deflection, the curved end 1184 (see FIG. 10) of the ridge 1180 passes over and beyond the projection 160 of the resilient biasing member 148. Once the ridge 1180 moves beyond the projection 160, the ridge 1180 is positioned behind the first projection 160, with the projection 160 being positioned within a pocket 1192 (see FIG. 10) formed adjacent a forward end of the sliding door 1126 between a front wall 1194 on an underside of the sliding door 1126 and the ridge 1180. In some embodiments, an upper portion of the projection 160 may abut one or both of the front wall 1194 and the ridge 1180 when the projection 160 is in the pocket 1192 in a similar fashion as discussed previously with reference to FIGS. 7-8. In this configuration, the single projection 160 of the resilient biasing member 148 helps maintain the sliding door 1126 in the open position without requiring other contact points between the resilient biasing member 148 and the sliding door 1126.

In a similar fashion as described previously, to close the sliding door 1126 from the open position, the resistive force created by the projection 160 against the ridge 1180 must be overcome. As the sliding door 1126 moves from the open position to the closed position, the ridge 1180 moves toward the projection 160. As the ridge 1180 rides against the projection 160, the cross member 158 is deflected forwardly and downwardly toward the gingival side 1120 in an arcuate path about the stem 156. The cross member 158 continues deflecting until the ridge 1180 moves beyond the projection 160, at which point, the cross member 158 deflects along the arcuate path to its original upright and unbiased position (as shown in FIG. 10).

Figure 12:
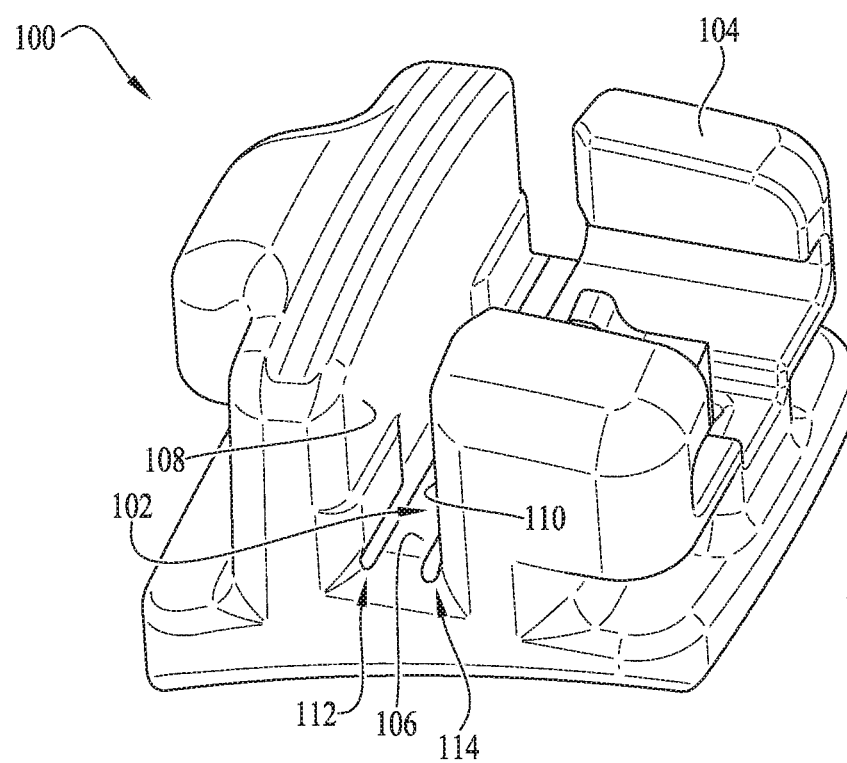
FIGS. 12-13 collectively illustrate features of a pair of channels disposed within an archwire slot of an orthodontic bracket in accordance with another embodiment.
Figure 13:
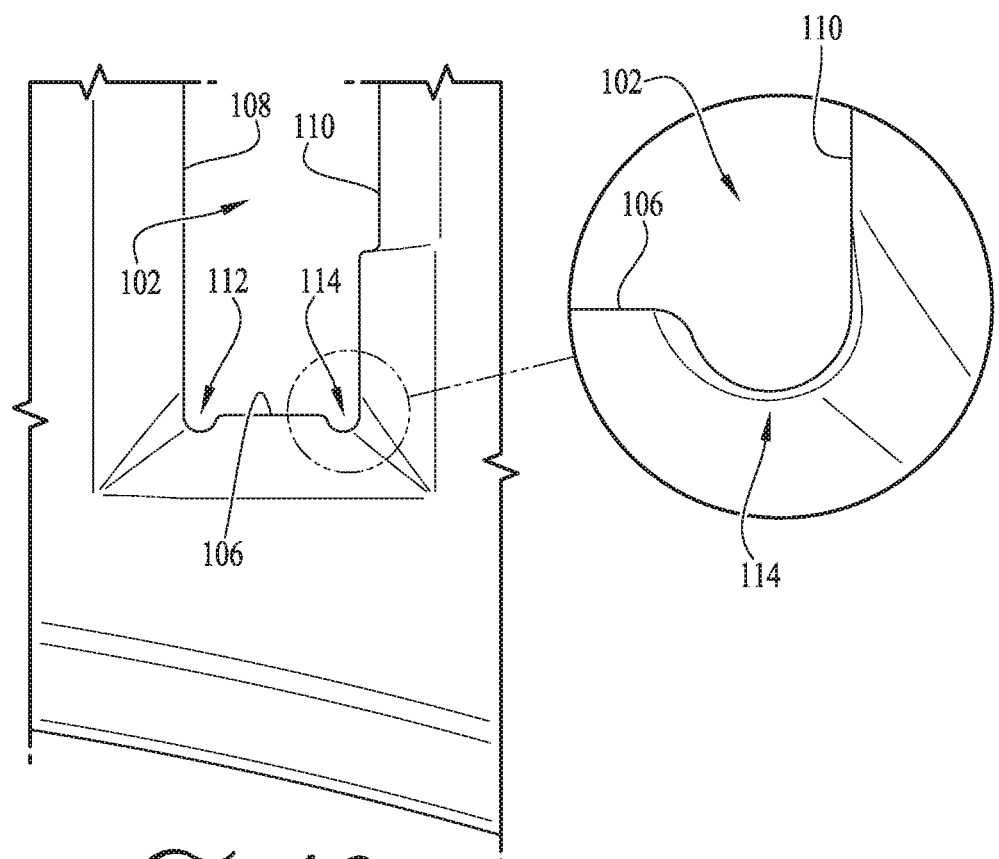

FIGS. 12-13 collectively illustrate features of another embodiment of an orthodontic bracket 100 (illustrated with the sliding door removed for convenience). As illustrated in FIG. 12, the bracket 100 includes many of the same features as the orthodontic bracket 10 illustrated in FIG. 1, although the bracket 100 is illustrated another embodiment without a hook on the gingival side (compare to FIG. 1). To avoid repetition, such common features of the orthodontic bracket 100 are not further discussed herein, with the understanding that the same or similar features of the orthodontic bracket 10 apply equally to the orthodontic bracket 100 of FIG. 12.

Turning to FIGS. 12 and 13, the orthodontic bracket 100 includes an archwire slot 102 extending across the bracket body 104 generally in a mesial-distal direction. The archwire slot 102 includes a base surface 106 and opposing side walls 108, 110 extending upwardly from the base surface 106 in the labial direction. In some embodiments, the side walls 108, 110 are perpendicular to the base surface 106 to form a generally rectilinear archwire slot 102 having open ends along the peripheral sides as illustrated. In some embodiments, the base surface 106 of the archwire slot 102 may further include a pair of recessed regions or channels 112, 114, where one channel 112 is formed between the base surface 106 and a bottom portion of the side wall 108, and the other channel 114 is formed between the base surface 106 and a bottom portion of the side wall 110. Preferably, the channels 112, 114 each extend across the entire archwire slot 102 from the mesial to distal side of the bracket body 104, though in other embodiments, the channels 112, 114 may extend only partway along the length of the archwire slot 102. In some embodiments, the channels 112, 114 may be formed as having generally curved or radiused profiles as illustrated in FIGS. 12-13. In other embodiments, the channels 112, 114 may have differently-shaped profiles, such as a more rectilinear-shaped profile. It should be understood that any suitable channel profile may be substituted without departing from the principles of the disclosed subject matter. The channels 112, 114 serve to improve the strength of the orthodontic bracket 100 and to minimize interference for a close fit between the archwire (not shown) and the archwire slot 102.

It should be understood that while the figures illustrate an example design for the particular features of the described orthodontic bracket, other configurations may be possible without departing from the principles of the disclosed subject matter. In addition, although the description above contains much specificity, these details should not be construed as limiting the scope of the disclosed subject matter, but as merely providing illustrations of some embodiments. It should be understood that subject matter disclosed in one portion herein can be combined with the subject matter of one or more of other portions herein as long as such combinations are not mutually exclusive or inoperable.

The terms and descriptions used above are set forth by way of illustration only and are not meant as limitations. It will be obvious to those having skill in the art that many changes may be made to the details of the above-described embodiments without departing from the underlying principles of the disclosed subject matter.

The invention claimed is:

1. An orthodontic bracket comprising:
a bracket body mountable to a tooth, the bracket body including a front body wall extending upwardly toward a labial side of the bracket body, and an archwire slot extending from a first side of the bracket body to an opposite second side, the archwire slot dimensioned to receive an archwire therein, the bracket body further including a seat;
a ligating member mountable to the bracket body and movable between a closed position and an open position, wherein the ligating member contacts the front body wall of the bracket body and wherein at least a portion of the ligating member extends over the archwire slot to retain the archwire within the archwire slot when the ligating member is in the closed position, and wherein the ligating member is offset from the archwire slot to provide access to the archwire when the ligating member is in the open position, the ligating member including a slot formed on an underside thereof, the slot having a pocket with a first surface, the slot further including a second surface; and
a resilient biasing member including a stem coupled to the seat of the bracket body, the stem extending upwardly from the seat toward the underside of the ligating member, the resilient biasing member further including a projection positioned within the slot on the underside of the ligating member when the ligating member is in both the open position and the closed position, wherein the projection extends into the pocket and abuts the first surface of the pocket to retain the ligating member in the open position, and wherein the projection contacts the second surface of the slot when the ligating member is in the closed position, the projection imparting a biasing force against the second surface of the slot to retain the ligating member in the closed position.

2. The orthodontic bracket of claim 1, wherein the ligating member further includes a front wall formed on the underside thereof, the front wall defining a boundary of the slot along a first end thereof.

3. The orthodontic bracket of claim 2, wherein the slot extends from the front wall of the ligating member and opens onto a rear side of the ligating member.

4. The orthodontic bracket of claim 2, wherein the pocket is formed between the front wall of the ligating member and the first surface on the underside of the ligating member.

5. The orthodontic bracket of claim 1, wherein the projection of the resilient biasing member rides along the second surface and toward the first surface as the ligating member moves from the closed position toward the open position.

6. The orthodontic bracket of claim 1, wherein the ligating member further includes a ridge formed within the slot, the ridge including the first surface and the second surface.

7. The orthodontic bracket of claim 6, where the ridge includes a curved transition surface between the first surface and the second surface, and wherein the projection rides against the curved transition surface as the ligating member moves between the open position and the closed position.

8. The orthodontic bracket of claim 1, wherein the second surface is a ramped surface, and wherein the projection rides against the ramped surface as the ligating member moves from the closed position to the open position.

9. The orthodontic bracket of claim 1, wherein the resilient biasing member includes a cross member extending from the stem, the cross member arranged generally parallel to a direction of motion of the ligating member between the open position and the closed position.

10. The orthodontic bracket of claim 1, wherein the archwire slot includes a first wall, an opposite second wall, and a bottom wall extending therebetween, the bracket body further including a first channel recessed into the bottom wall of the archwire slot along the first wall and a second channel recessed into the bottom wall of the archwire slot along the second side wall.

11. The orthodontic bracket of claim 10, wherein the first wall extends perpendicularly relative to the bottom wall, the first channel bounded on one side by a bottom portion of the first wall, and wherein the second wall extends perpendicularly relative to the bottom wall, the second channel bounded on one side by a bottom portion of the second wall.

12. The orthodontic bracket of claim 11, wherein the first channel and the second channel each extend beneath an uppermost surface of the bottom wall of the archwire slot.

13. The orthodontic bracket of claim 12, wherein the first channel and the second channel each extend across the bottom wall from the first side of the bracket body to the opposite second side.

14. The orthodontic bracket of claim 1, wherein the seat is formed along a labial surface of the bracket body, and wherein a first portion of the stem is inserted into the seat and a second portion of the stem extends from the seat and upwardly relative to the labial surface in a generally upright direction toward the underside of the ligating member.

15. The orthodontic bracket of claim 1, wherein the second surface is angled relative to the first surface.

16. An orthodontic bracket comprising:
a bracket body mountable to a tooth, the bracket body including an archwire slot extending from a first side of the bracket body to an opposite second side, the archwire slot dimensioned to receive an archwire therein, the bracket body further including a seat;
a ligating member mountable to the bracket body and movable between a closed position and an open position, wherein at least a portion of the ligating member extends over the archwire slot to retain the archwire within the archwire slot when the ligating member is in the closed position, and wherein the ligating member is offset from the archwire slot to provide access to the archwire when the ligating member is in the open position, the ligating member including a slot formed on an underside thereof, the slot including a first surface and a second surface;
a resilient biasing member including a stem coupled to the seat of the bracket body and a projection positioned within the slot on the underside of the ligating member when the ligating member is in both the open position and the closed position, wherein the projection abuts the first surface of the slot to retain the ligating member in the open position, and wherein the projection imparts a biasing force against the second surface of the slot to retain the ligating member in the closed position; and
a channel disposed between a labial surface of the bracket body and the underside of the ligating member, wherein the resilient biasing member includes a cross member extending from the stem, and wherein the cross member flexes along an arcuate path about the stem as the ligating member moves between the open position and the closed position.

17. The orthodontic bracket of claim 16, wherein a first end of the channel opens into and is in communication with the archwire slot.

18. The orthodontic bracket of claim 17, wherein a second end of the channel opens along a rear side of the bracket body.

19. The orthodontic bracket of claim 16, wherein the archwire slot includes a first wall, an opposite second wall, and a bottom wall extending therebetween, the bracket body further including a first channel recessed into the bottom wall of the archwire slot along the first wall and a second channel recessed into the bottom wall of the archwire slot along the second side wall.

20. An orthodontic bracket comprising:
a bracket body mountable to a tooth, the bracket body including an archwire slot extending from a first side of the bracket body to an opposite second side, the archwire slot dimensioned to receive an archwire therein, the bracket body further including a seat;
a ligating member mountable to the bracket body and movable between a closed position and an open position, wherein at least a portion of the ligating member extends over the archwire slot to retain the archwire within the archwire slot when the ligating member is in the closed position, and wherein the ligating member is offset from the archwire slot to provide access to the archwire when the ligating member is in the open position, the ligating member including a slot formed on an underside thereof, the slot including a first surface and a second surface; and
a resilient biasing member including a stem coupled to the seat of the bracket body and a projection positioned within the slot on the underside of the ligating member when the ligating member is in both the open position and the closed position, wherein the projection abuts the first surface of the slot to retain the ligating member in the open position, and wherein the projection imparts a biasing force against the second surface of the slot to retain the ligating member in the closed position,
wherein the resilient biasing member includes a cross member extending from the stem, the cross member including the projection, and wherein the resilient biasing member is formed from a flat stock material such that the stem, the cross member, and the projection each includes a first planar surface and an opposite second planar surface separated by an edge surface extending therebetween, the edge surface having a width that is smaller than the respective width of the first planar surface and the second planar surface.

* * * * *